United States Patent [19]

Ozawa

[11] Patent Number: 4,965,631
[45] Date of Patent: Oct. 23, 1990

[54] DEVICE FOR MOUNTING PHOTOGRAPHIC NEGATIVE CARRIER

[75] Inventor: Yoshio Ozawa, Kanagawa, Japan

[73] Assignee: Fuji Photo Film Co., Ltd., Kanagawa, Japan

[21] Appl. No.: 288,884

[22] Filed: Dec. 23, 1988

[30] Foreign Application Priority Data

Jan. 28, 1988 [JP] Japan .................................. 63-17674

[51] Int. Cl.⁵ ............................................ G03B 27/62
[52] U.S. Cl. ......................................... 355/75; 355/76
[58] Field of Search ..................................... 355/75, 76

[56] References Cited

U.S. PATENT DOCUMENTS

4,736,228  4/1988  Ito ......................................... 355/75

Primary Examiner—Michael L. Gellner
Assistant Examiner—Khanh Dang
Attorney, Agent, or Firm—Sughrue, Mion, Zinn, Macpeak & Seas

[57] ABSTRACT

A negative carrier which holds an intermediate portion of a negative film from opposite sides is mounted upon a base plate having an opening for printing. The carrier brings the printing opening formed in the negative film into registry with the opening in the base plate having locating protrusions. The carrier can be moved into the opening in the plate from any one of plural different directions. During this movement, the carrier is guided and allowed to assume only a given posture by the protrusions. Thus, the film is inserted also in the same posture. Consequently, ends of the film are prevented from inadvertently being inserted into the opening in the plate, which would otherwise hinder the work.

18 Claims, 7 Drawing Sheets

DEVICE FOR MOUNTING PHOTOGRAPHIC NEGATIVE CARRIER

FIELD OF THE INVENTION

The present invention relates to a device which is for use with a photographic printer capable of varying printing magnification and acts to mount a negative carrier carrying a negative film upon a base plate.

BACKGROUND OF THE INVENTION

A photographic printer loads a negative film on a negative carrier, which is then mounted on a base plate to print the film. This printer is required to have means for placing the negative film in position on the base plate. Specifically, to perform a printing operation efficiently, the center of the negative film must be precisely located on the optical axis of printing, and then the density of the film must be automatically measured with an optical system and image pickup devices. For this purpose, it is desired to mount engaging means between the negative carrier and the base plate to precisely place the carrier in position. The negative film is frequently inserted along the optical axis of printing from the front side. Sometimes, it is necessary to invert and insert it from one lateral side before it is printed.

SUMMARY OF THE INVENTION

In view of the foregoing situation, it is an object of the invention to provide a negative carrier-mounting device which can move a negative carrier into a desired position on a base plate from any one of two mutually perpendicular directions.

The invention lies in a device which mounts a negative carrier carrying a negative film on a base plate to print the film. The device is characterized by the provision of engaging means between the negative carrier and the base plate to permit the carrier to be moved toward the optical axis from any one of two mutually perpendicular directions only when the carrier assumes a given posture.

Since the engaging means enable the negative carrier to be brought onto the optical axis from any one of the two mutually perpendicular directions, either an erect image or an inverted image can be printed. Because the negative film is allowed to be inserted into the base plate only when it assumes a given posture, it is unlikely that one end of a short piece of a negative film consisting of 6 frames enters the printing opening in the base plate. Consequently, the printing operation can be effected easily.

Other objects and features of the invention will appear in the course of the description thereof which follows.

DETAILED DESCRIPTION OF THE INVENTION

Figure 2:
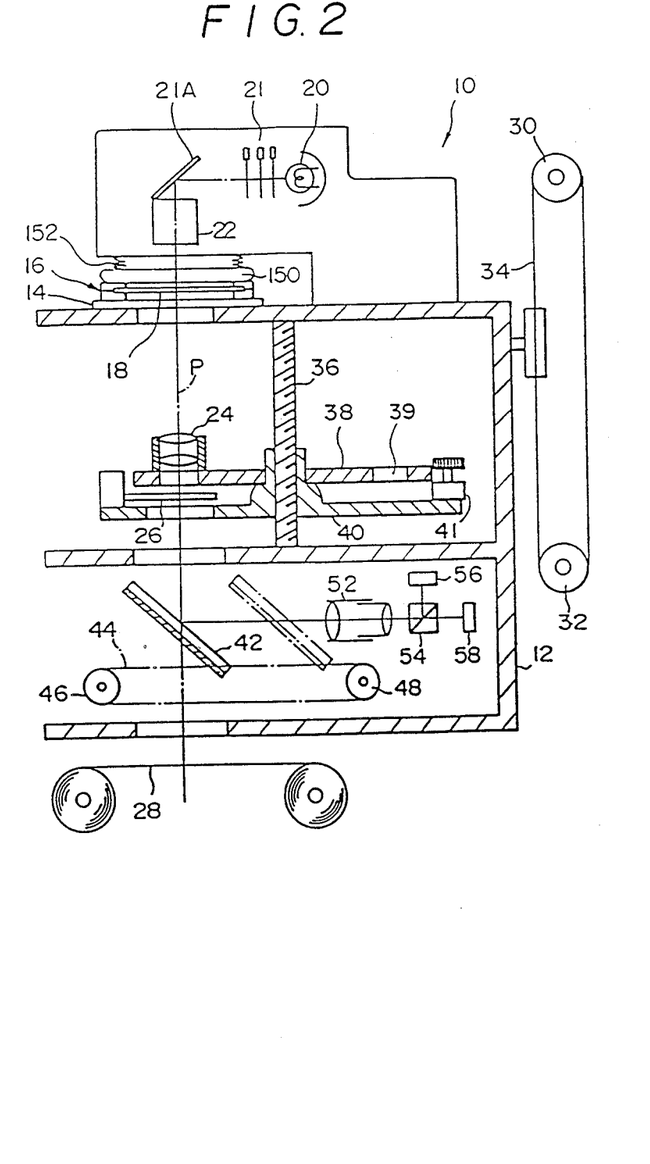
FIG. 2 is a vertical cross section of a photographic printer with which the device shown in FIG. 1 is used.

Referring to FIG. 2, there is shown a photographic printer according to the invention. This device, generally indicated by numeral 10, is in an erect posture. The printer 10 has a housing 12 on which a base plate 14 is mounted. A photographic negative carrier 16 can be carried on the plate 14. A negative film 18 is loaded into the carrier 16.

A light source 20, YMC filters 21, a mirror 21A, and a light-diffusing cylinder 22 are disposed in a coaxial relation with the negative carrier 16 inside the housing 12. Light emitted by the light source 20 passes through a printing lens 24 and a shutter 26 and falls upon a photographic paper 28, for printing. A belt 34 is trained around pulleys 30 and 32. The housing 12 is attached to the pulley 34. An electric motor (not shown) drives the pulleys 30 and 32 to move them up and down as viewed in FIG. 2.

The lens 24 is mounted on a turret 38, which is installed on an elevating support 40 by a threaded shaft 36. The elevating support 40 is pivotally mounted on the housing 12. An electric motor 41 is mounted on the elevating support 40 to rotate the turret 38, for bringing other printing lens onto the optical axis. The elevating support 40 is prevented from turning. When the shaft 36 is rotated by an electric motor (not shown), the shaft 36 moves upward or downward together with the turret 38 to change the conjugate length of the lens 24.

A reflecting mirror 42 is disposed so as to be slidable horizontally inside the housing 12. A portion of the mirror 42 is attached to a belt 44 which is trained around pulleys 46 and 48 to shift the mirror 42 right or left as viewed in FIG. 2, for moving the mirror toward or away from the optical axis.

Light emanating from the light source 20 is reflected by the mirror 42, passes through a zoom lens 52 and a beam splitter 54, and impinge upon two image pickup devices 56 and 58. The size of the negative image focused on each of the pickup devices 56, 58 depends upon the setting of the zoom lens 52. The whole negative image is scanned and the light intensity at every point on the image is measured.

Figure 1:
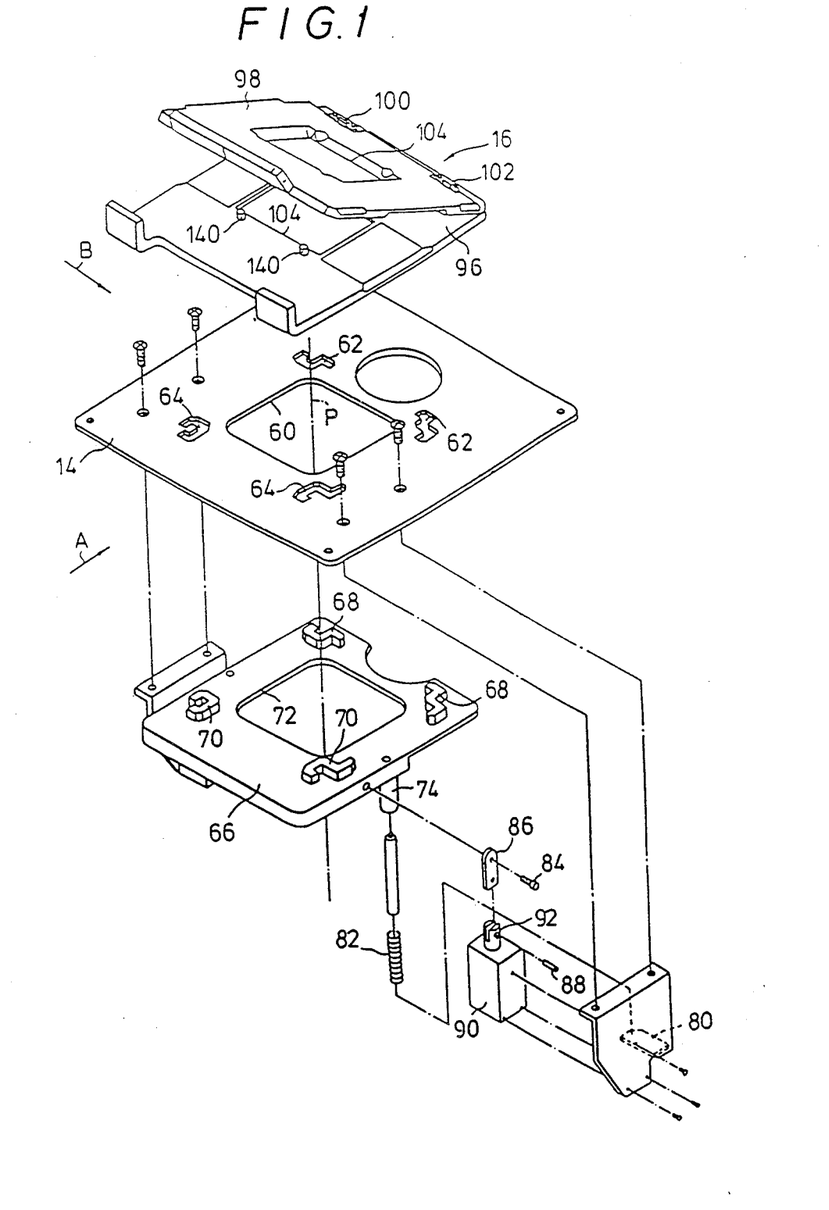
FIG. 1 is an exploded perspective view of a negative carrier-mounting device according to the invention.
Figure 3:
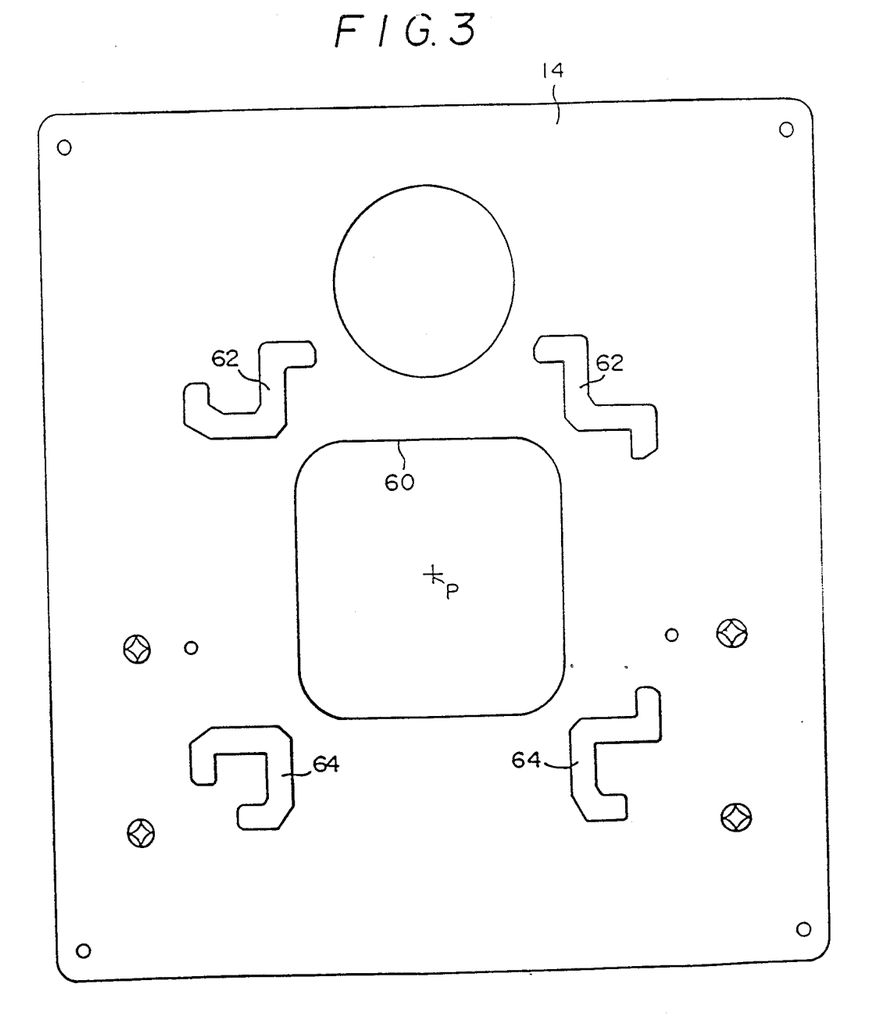
FIG. 3 is a plan view of the base plate shown in FIG. 2, as viewed in the direction of the optical axis.
Figure 4:
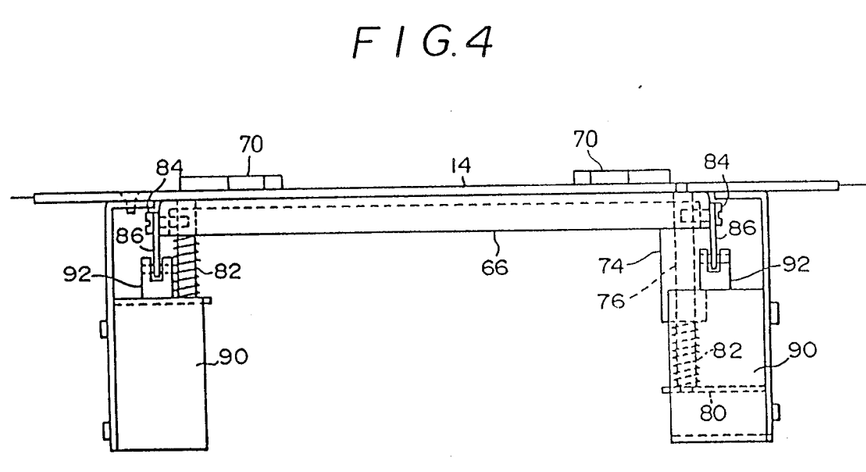
FIG. 4 is a bottom view of the base plate shown in FIG. 3.

As shown in FIGS. 1, 3, and 4, the base plate 14 is provided with a rectangular opening 60 whose center lies on the printing optical axis P. Two pairs of slots 62, 64 are formed around the four corners of the opening 60 and extend through the plate 14.

An elevating plate 66 is disposed below the base plate 14. Two pairs of locating protrusions 68, 70 are rigidly fixed to the plate 66, corresponding to the slots 62 and 64. When the elevating plate 66 has been raised, the protrusions 68 and 70 pass through the slots 62 and 64, respectively, and protrude above the base plate 14. Under this condition, when the negative carrier 16 is inserted from the direction indicated by the arrow A or from the direction indicated by the arrow B, the carrier 16 is guided by the protrusions 68 and 70. The directions indicated by the arrows A and B are perpendicular to the optical axis P and meet each other at right angles on the axis P. The operator approaches the printer 10 in the direction indicated by the arrow A. When the elevating plate 66 has been lowered, it is located under the base plate 14.

The elevating plate 66 is provided with a rectangular opening 72 corresponding to the rectangular opening 60 in the base plate 14. Blocks 74 protrude from the vicinities of opposite ends of the opening 72. As shown in FIG. 4, guide rods 76 extending downward from the base plate 14 extend through the blocks 74. Thus, the elevating plate 66 can move up and down along the guide rods 76 below the base plate 14. Brackets 80 protrude from the housing 12. A compressed coil spring 82 is interposed between each bracket 80 and the lower end of each guide rod 76 protruding from each block 74 to bias the elevating plate 66 upward toward the base plate 14.

A connecting plate 86 is pivotally mounted to one side of the elevating plate 66 by a screw 84. A solenoid 90 has an actuator 92 to which the connecting plate 86 is pivotally mounted via a pin 88. The actuator 92 is mounted to the housing 12. A control device (not shown) energizes the actuator 92 to cause it to produce a magnetic force. This force pulls the actuator 92 downward together with the elevating plate 66 against the biasing force of the coil spring 82. Therefore, when the actuator 92 operates, the elevating plate 66 is moved downward.

Figure 5:
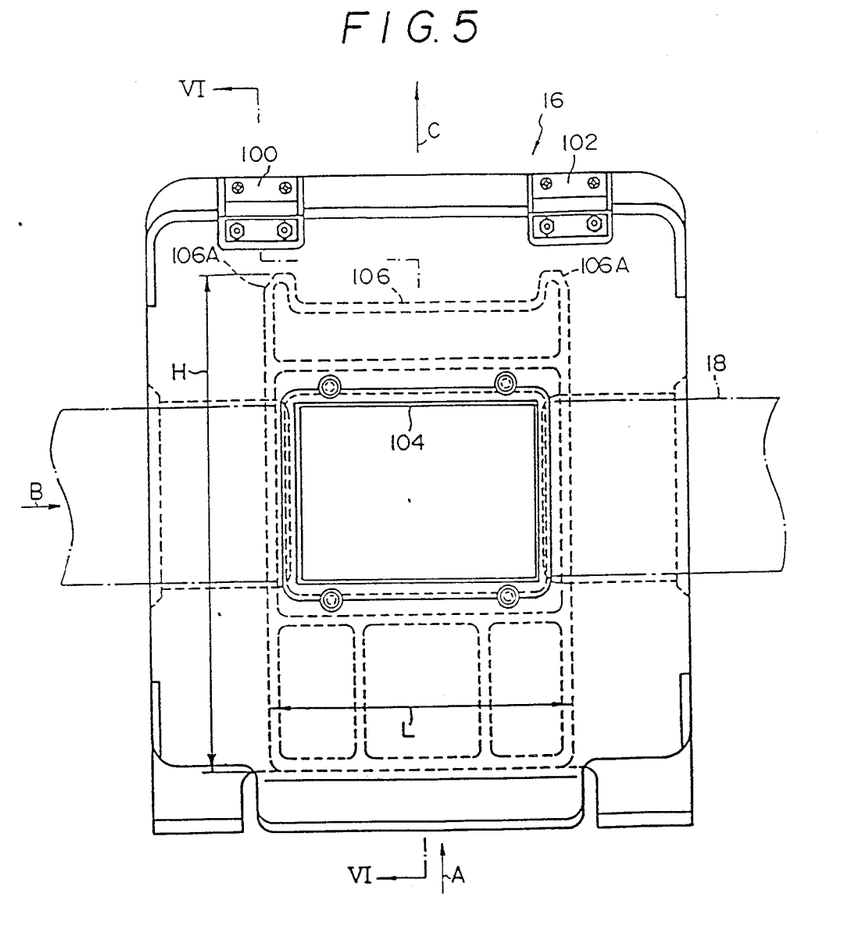
FIG. 5 is a front elevation of the negative carrier shown in FIG. 1.
Figure 6:
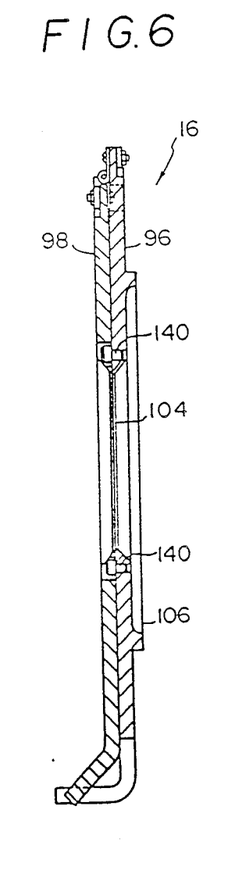
FIG. 6 is a side elevation of the negative carrier shown in FIG. 5.

As shown in FIGS. 5 and 6, the negative carrier 16 comprises a lower mask plate 96 and an upper mask plate 98 which are connected together at their respective one ends by hinges 100 and 102. The mask plates 96 and 98 form a rectangular opening 104, which in turn forms a mask for the negative film 18 sandwiched between the lower mask plate 96 and the upper mask plate 98.

Figure 7:
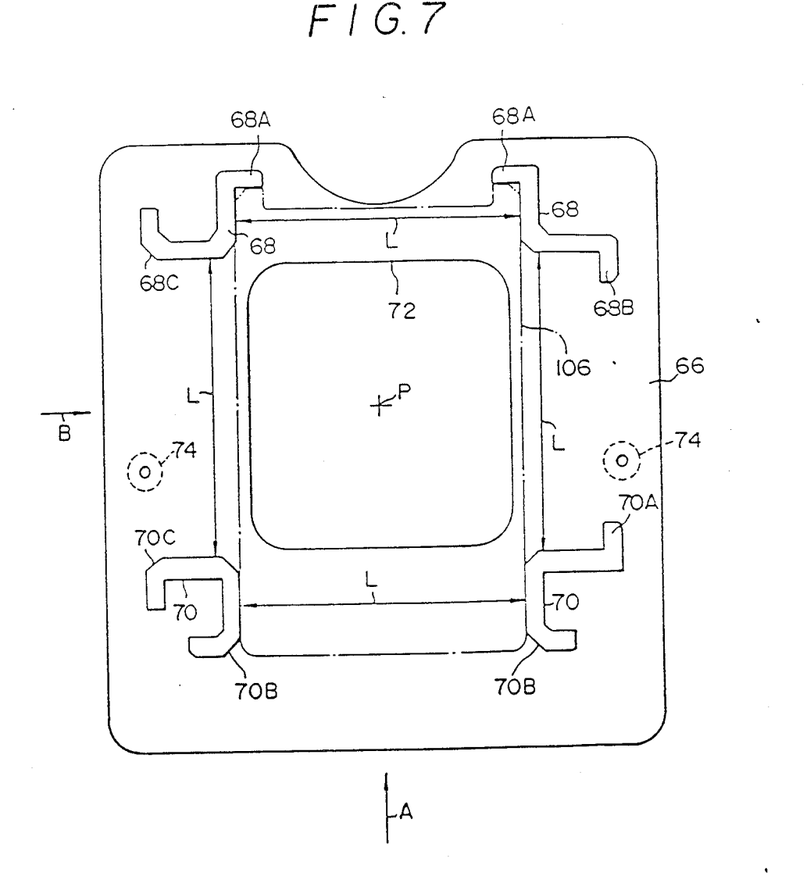
FIG. 7 is a front elevation of the elevating plate shown in FIG. 1.

A rectangular locating protrusion 106 is formed on the surface of the lower mask plate 96 that is on the opposite side of the plane within which the negative film is held. The relation of the locating protrusion 106 to the locating protrusions 68, 70 is now described. As shown in FIG. 5, the planar form of the protrusion 106 has a longer side of length H in the direction indicated by the arrow A and a shorter side of length L in the perpendicular direction. As shown in FIG. 7, the protrusion 106 can be moved in the direction indicated by the arrow A to insert it between the locating protrusions 68 and between the locating protrusions 70. Also, the protrusion 106 can be moved in the direction indicated by the arrow B to insert it between one protrusion 68 and one protrusion 70 and between the other protrusion 68 and the other protrusion 70. The negative carrier 16 is allowed to be inserted only in the direction indicated by the arrow C as shown in FIG. 5. That is, during this insertion, the carrier 16 can assume only one posture.

As shown in FIG. 7, each of the locating protrusions 68 and 70 is shaped like the letter "L" and bent near one corner of the rectangular opening 72. The protrusions 68 and 70 form parallel guide walls of length L for the locating protrusion 106 inserted in the direction indicated by the arrow A or in the direction indicated by the arrow B. A stopper 68A is formed at one end of each locating protrusion 68 to limit the amount by which the locating protrusion 106 is inserted when it is moved in the direction indicated by the arrow A. In this way, the center of the rectangular opening 104 is located on the optical axis P. Similarly, stoppers 68B and 70A are formed to restrict the movement of the protrusion 106 when it is inserted in the direction indicated by the arrow B. In this way, the parallel guide walls have a width of L in the directions indicated by the arrows A and B. Therefore, the negative carrier 16 can be mounted to the elevating plate 66 only by moving the carrier 16 in the direction indicated by the arrow C in FIG. 5.

The locating protrusion 106 has chamfers 106A at both corners of the front side as viewed in the direction indicated by the arrow C. The locating protrusions 70 have chamfers 70B at their front ends as viewed in the direction indicated by the arrow A. The locating protrusions 68 and 70 which are located at the entrance side as viewed in the direction indicated by the arrow B have chamfers 68C and 70C, respectively. These chamfers act to guide the carrier when it is inserted.

As shown in FIG. 2, the negative carrier 16 is pressed against the base plate 14 by a pressure plate 150 and a compressed coil spring 152.

The present device operates in the manner described below. When the negative film 18 is printed, it is held between the lower mask plate 96 and the upper mask plate 98 as shown in FIG. 5. The negative carrier 16 is then mounted on the base plate 14 from the direction indicated by the arrow C in FIG. 5. At this time, if the carrier 16 is inserted in the direction indicated by the arrow A or in the direction indicated by the arrow B in FIG. 7, the opposite inner portions of the locating protrusions 68 and 70 which are caused to protrude over the base plate 14 by the biasing force of the coil spring 82 face opposite sides of the locating protrusion 106. Hence, the negative carrier 16 can be mounted precisely. Insertion of the carrier 16 from directions other than the correct direction indicated by the arrow C in FIG. 5 is precluded. Therefore, the ends of the negative film 18 which protrude from both sides of the carrier 16 as shown in FIG. 5 are prevented from entering the rectangular opening 72 in the elevating plate 66. Consequently, the operation is not hindered. When the front end of the protrusion 106 bears against either the stoppers 68A or the stoppers 68B and 70A, the negative film 18 is located on the optical axis.

Then, a metering button (not shown) is depressed, and the image on the negative film 18 is detected. In particular, as shown in FIG. 2, the belt 44 is driven to place the mirror 42 on the optical axis. The motor 41 is driven to rotate the turret 38, for bringing an opening 39 formed in the turret 38 onto the optical axis.

Light emitted from the light source 20 for printing is diffused by the light-diffusing cylinder 22 and falls on the negative film 18. The light transmitted through the film 18 passes through the opening in the turret 38 and is reflected laterally by the mirror 42. The reflected light passes through the zoom lens 52, and is divided into two light beams by the beam splitter 54. The two light beams impinge on the pickup devices 56 and 58 on which negative images of sizes corresponding to the size of the negative are focused by the zoom lens 52. The negative images are scanned, and the density of each of numerous points on the images is measured. The amount of exposure for printing is calculated from the measured values of density.

During printing, the motor 41 rotates the turret 38 to place the printing lens 24 corresponding to the printing magnification onto the optical axis. Simultaneously, the mirror 42 shifts to the right as viewed in FIG. 2, thus moving away from the optical axis of printing. Then, the shutter 26 opens for a time corresponding to the amount of exposure for printing, so that the image on the negative film is printed on the photographic paper 28.

A magnification-specifying key (not shown) is operated to modify the printing magnification. The threaded shaft 36 is rotated through an angle corresponding to the specified printing magnification to move the turret 38 upward or downward. The belt 34 is driven to cause the housing 12 to move a desired distance. Then, the positional relation between the negative film 18 and the printing lens 24 changes, varying the conjugate length of the geometrical path.

When the negative is cropped, the image is detected. At the same time, the solenoid 90 is energized to lower the elevating plate 66. The locating protrusions 68 and 70 move downward away from the base plate 14. Since no protrusions exist on the base plate 14, the negative carrier 16 is free to move. Therefore, the operator can shift the carrier 16 to any desired position. Then, the operator is able to print a desired portion of the image.

As described in detail thus far, the present invention provides a device which mounts a negative carrier carrying a negative film on a base plate and prints the film. The device is characterized by the provision of engaging means disposed between the negative carrier and the base plate to permit the negative carrier to assume a given posture, whether the carrier is moved onto the optical axis from one or the other of two mutually perpendicular directions. Advantageously, the negative film can be moved onto the base plate from any one of the two mutually perpendicular directions.

What is claimed is:

1. A device for mounting a negative carrier carrying a negative film into a photographic printer, said device comprising:
    a base plate which is provided with an opening for printing and upon which the negative film is placed; and
    engaging means disposed between the base plate and the negative carrier to permit the negative carrier to be moved into a printing position upon the base plate and toward the optical axis of printing from any one of plural different directions in such a way that the carrier can assume only a given posture, whereby the ends of the negative film protruding from the carrier are prevented from falling into the opening, said engaging means comprising locating protrusions protruding from the rear side of said negative carrier and locating protrusions protruding from said base plate, said base plate locating protrusions being operative to guide the carrier locating protrusions.

2. The device of claim 1, wherein said negative carrier extends substantially perpendicular to the direction in which the film is moved into the opening to hold the film in the carrier.

3. The device of claim 1, wherein the locating protrusions of the base plate have stoppers for limiting the amount of movement made by the negative carrier when the carrier is mounted.

4. A device for mounting a negative carrier carrying a negative film into a photographic printer, said device comprising:
    a base plate which is provided with an opening for printing and upon which the negative film is placed; and
    engaging means disposed between the base plate and the negative carrier to permit the negative carrier to be moved into a printing position upon the base plate and toward the optical axis of printing from any one of a plurality of different directions in such a way that the carrier can assume only a given posture, whereby the ends of the negative film protruding from the carrier are prevented from falling into the opening, said engaging means comprising locating protrusions protruding from the rear side of the negative carrier, and locating protrusions disposed on said base plate, said base plate locating protrusions being operative to guide the carrier locating protrusions, wherein the locating protrusions of the base plate can be protruded from the body of the base plate and retracted within the body of the base plate, and wherein when these locating protrusions are retracted, the negative carrier can be moved into any desired position.

5. The device of claim 4, wherein said locating protrusions are biased in such directions as to protrude from the base plate.

6. The device of claim 5, wherein the locating protrusions of the base plate act to guide both sides of the locating protrusions of the negative carrier which extend along the direction of insertion.

7. The device of claim 6, wherein said locating protrusions of the base plate are plural in number and guide both sides of the locating protrusions of the negative carrier which extend along the direction of insertion, and wherein the locating protrusions of the base plate are spaced from each other.

8. The device of claim 7, wherein when the negative carrier is moved toward the optical axis in a posture different from said given posture, the distance between the outer ends of the protrusions extending from the rear side of the negative carrier becomes larger than the distance by which the protrusions extending from the base plate are spaced from each other, whereby the carrier is prevented from reaching the optical axis.

9. The device of claim 8, wherein the locating protrusions of the base plate protrude from the vicinities of the four corners of said opening that is rectangular in shape, and wherein the locating protrusions of the base plate are disposed corresponding to both sides of the locating protrusions of the mounted negative carrier.

10. The device of claim 9, wherein the locating protrusions of the base plate take a substantially L-shaped form as viewed in the direction of the optical axis of the printing, and wherein each different side of each L-shaped protrusion acts to guide the negative carrier when the carrier is mounted from a different direction.

11. The device of claim 10, wherein each of the L-shaped protrusion is bent near one corner of the rectangular opening.

12. A device for mounting a negative carrier which holds a relatively narrow intermediate portion of a negative film from opposite sides and loads the held film into a photographic printer, said device comprising:
    a base plate having an opening in which the negative film is received for printing;
    first locating protrusions that are formed on the negative carrier so as to face the base plate when the negative carrier is loaded; and
    second locating protrusions protruding from the base plate and permitting the negative carrier to be moved into the opening in the base plate from any one of plural different directions, the second locating protrusions being spaced from each other by a first distance larger than the distance between the outer ends of the first locating protrusions as viewed in a direction perpendicular to the direction in which the negative carrier is mounted in a normal manner, the first distance being less than the distance between the outer ends of the first locating protrusions as viewed in a direction perpendicular to the direction in which the negative carrier is mounted in an abnormal manner, whereby the negative carrier is inserted into the opening in the base plate in a given posture.

13. The device of claim 12, wherein the second protrusions bear against and guide both sides of the first locating protrusions which extend along the direction of insertion of the first locating protrusions.

14. The device of claim 12, wherein the second locating protrusions are four in number and disposed near the four corners of the rectangular opening in the base plate.

15. The device of claim 14, wherein the second locating protrusions have guide surfaces which extend along the direction of insertion of the first locating protrusions.

16. The device of claim 15, wherein said protrusions each have plural guide surfaces which guide the first locating protrusions inserted into the opening from any one of said different locations.

17. The device of claim 16, wherein said plural guide surfaces are perpendicular to each other.

18. A device for mounting a negative carrier which holds a relatively narrow intermediate portion of a negative film from opposite sides and loads the held film into a photographic printer, said device comprising:
 a base plate having an opening in which the negative film is received for printing;
 first locating protrusions that are formed on the negative carrier so as to face the base plate when the negative carrier is loaded;
 second locating protrusions protruding from the base plate and permitting the negative carrier to be moved into the opening in the base plate from any one of a plurality of different directions, the second locating protrusions being spaced from each other by a first distance larger than the distance between the outer ends of the first locating protrusions as viewed in a direction perpendicular to the direction in which the negative carrier is mounted in a normal manner, the first distance being less than the distance between the outer ends of the first locating protrusions as viewed in direction perpendicular to the direction in which the negative carrier is mounted in an abnormal manner, whereby the negative carrier is inserted into the opening in the base plate in a given posture, and wherein the second locating protrusions are mounted to the base plate so as to be capable of being retracted within the body of the base plate.

* * * * *